US00RE42650E

(19) United States
(12) Reissued Patent
Galburt et al.

(10) Patent Number: US RE42,650 E
(45) Date of Reissued Patent: Aug. 30, 2011

(54) FLUID GAUGE PROXIMITY SENSOR AND METHOD OF OPERATING SAME USING A MODULATED FLUID FLOW

(75) Inventors: Daniel N. Galburt, Wilton, CT (US); Earl W. Ebert, Oxford, CT (US); Joseph H. Lyons, Wilton, CT (US)

(73) Assignee: ASML Holding N.V., Veldhoven (NL)

(21) Appl. No.: 11/831,558

(22) Filed: Jul. 31, 2007

Related U.S. Patent Documents

Reissue of:
(64) Patent No.: 7,134,321
Issued: Nov. 14, 2006
Appl. No.: 10/894,028
Filed: Jul. 20, 2004

(51) Int. Cl.
*G01B 13/08* (2006.01)

(52) U.S. Cl. ..... 73/37.5

(58) Field of Classification Search ..... 73/37.5, 73/37.6, 37.9

See application file for complete search history.

(56) References Cited

U.S. PATENT DOCUMENTS

| | | | |
|---|---|---|---|
| 2,276,036 | A | 3/1942 | Hanna et al. |
| 2,471,737 | A | 5/1949 | Fox |
| 2,707,389 | A | 5/1955 | Fortier |
| 2,986,924 | A | 6/1961 | Becker |
| 3,127,764 | A | 4/1964 | Hudson |
| 3,482,433 | A | 12/1969 | Gladwyn |
| 3,495,442 | A | 2/1970 | Rejsa |
| 3,513,688 | A | 5/1970 | Thibault |
| 3,545,256 | A | 12/1970 | Beeken |
| 3,597,961 | A | 8/1971 | Pinkstaff |
| 3,709,027 | A | 1/1973 | Beeken |
| 3,881,357 | A | 5/1975 | Sahlin |
| 3,886,794 | A | 6/1975 | McShane |
| 3,894,552 | A | 7/1975 | Bowditch |

(Continued)

FOREIGN PATENT DOCUMENTS

JP 57-191507 A 11/1982

(Continued)

OTHER PUBLICATIONS

Office Action and Translation of Office Action for Japanese Patent Application No. 2005-210532 mailed Sep. 26, 2008, 8 pgs.

(Continued)

*Primary Examiner* — John Fitzgerald
(74) *Attorney, Agent, or Firm* — Sterne, Kessler, Goldstein & Fox P.L.L.C.

(57) ABSTRACT

A system and method that use a fluid gauge proximity sensor. A source of modulated unidirectional or alternating fluid flow travels along at least one path having a nozzle and a flow or pressure sensor. The fluid exists at a gap between the nozzle and a target. The sensor outputs an amplitude modulated signal that varies according to a size of the gap. The amplitude modulated signal is processed either digitally or in analog devices, which can include being filtered (e.g., band pass, band limited, high pass, etc. filter) to include the modulated frequency and sufficient bandwidth on either side of that frequency and/or being demodulated using a demodulator operating at the acoustical driver modulation frequency. Using this system and method can result in only ambient acoustical energy in a desired frequency range of the device actually having the opportunity to interfere with the device operation. This can lower the devices overall sensitivity to external acoustical noise and sensor offset.

14 Claims, 12 Drawing Sheets

U.S. PATENT DOCUMENTS

| | | | |
|---|---|---|---|
| 3,904,960 | A | 9/1975 | Niehaus |
| 3,942,556 | A | 3/1976 | Wojcikowski |
| 4,000,650 | A | 1/1977 | Snyder |
| 4,090,406 | A | 5/1978 | Rodder |
| 4,142,401 | A | 3/1979 | Wilson |
| 4,173,143 | A | 11/1979 | Venton-Walters |
| 4,203,022 | A | 5/1980 | Couch et al. |
| 4,318,303 | A | 3/1982 | Harrington |
| 4,348,889 | A | 9/1982 | Haynes et al. |
| 4,391,127 | A | 7/1983 | Hawkins |
| 4,421,970 | A | 12/1983 | Couch, Jr. |
| 4,458,519 | A | 7/1984 | Day et al. |
| 4,545,244 | A | 10/1985 | Yasuda et al. |
| 4,550,592 | A | 11/1985 | Dechape |
| 4,579,005 | A | 4/1986 | Brown |
| 4,581,918 | A | 4/1986 | Duhrin |
| 4,607,960 | A | 8/1986 | Wulff |
| 4,655,089 | A | 4/1987 | Kappelt et al. |
| 4,912,410 | A | 3/1990 | Morley |
| 4,953,388 | A | 9/1990 | Barada |
| 5,022,258 | A | 6/1991 | Wilson |
| 5,317,898 | A | 6/1994 | Nemeth |
| 5,429,001 | A | 7/1995 | Kleven |
| 5,503,035 | A | 4/1996 | Itoh et al. |
| 5,789,661 | A | 8/1998 | Fauque et al. |
| 6,220,080 | B1 | 4/2001 | Fauque |
| 6,807,845 | B2 | 10/2004 | Halbinger et al. |
| 7,010,958 | B2 | 3/2006 | Gajdeczko et al. |
| 7,021,119 | B2 | 4/2006 | Violette |
| 7,021,120 | B2 | 4/2006 | Carter et al. |
| 7,021,121 | B2 | 4/2006 | Ebert et al. |
| 7,134,321 | B2 | 11/2006 | Galburt et al. |
| 2004/0118183 | A1 | 6/2004 | Gajdeczko et al. |
| 2004/0118184 | A1 | 6/2004 | Violette |
| 2005/0044963 | A1 | 3/2005 | Lyons |
| 2005/0217384 | A1 | 10/2005 | Gajdeczko et al. |

FOREIGN PATENT DOCUMENTS

| | | | | |
|---|---|---|---|---|
| JP | 57191507 | A | * | 11/1982 |
| JP | 61-280509 | A | | 12/1986 |
| JP | 62-096806 | A | | 5/1987 |
| JP | 6-201359 | A | | 7/1994 |
| JP | 06-201359 | A | | 7/1994 |
| JP | 2001-099633 | A | | 4/2001 |
| JP | 2004-198429 | A | | 7/2004 |

OTHER PUBLICATIONS

English language Abstract of Japanese Patent Publication No. 62-096806 A, Published May 6, 1987; 1 page.

English language Abstract of Japanese Patent Publication No. 06-201359 A, Published Jul. 19, 1994; 1 page.

English language Abstract of Japanese Patent Publication No. 2001-099633 A, Published Apr. 13, 2001; 1 page.

English language Abstract of Japanese Patent Publication No. 2004-198429 A, Published Jul. 15, 2004; 1 page.

English translation of Japanese Decision of Dismissal of Amendment directed to related Japanese Patent Application No. 2005-210532, Japanese Patent Office, mailed Apr. 19, 2011; 2 pages.

Gajdeczko et al., U.S. Appl. No. 10/812,098, filed Mar. 30, 2004, entitled "Pressure Sensor," 24 pages.

Carter et al., U.S. Appl. No. 10/833,249, filed Apr. 28, 2004, entitled "High Resolution Gas Gauge Proximity Snesor," 29 pages.

Ebert et al., U.S. Appl. No. 10/854,429, filed May 27, 2004, entitled "Gas Gauge Proximity Sensor with a Modulated Gas Flow," 43 pages.

* cited by examiner

FLUID GAUGE PROXIMITY SENSOR AND METHOD OF OPERATING SAME USING A MODULATED FLUID FLOW

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to an apparatus and method for detecting very small distances, and more particularly to proximity sensing with fluid flow.

2. Related Art

Many automated manufacturing processes require the sensing of the distance between a manufacturing tool and a product or material surface being worked, often referred to as the "work piece" (e.g., a semiconductor wafer, a flat panel display substrate, or the like). In some situations, such as lithography (e.g., maskless lithography, immersion lithography, photolithography, etc), the distance must be measured with accuracy approaching a nanometer.

The challenges associated with creating a proximity sensor of such accuracy are significant, particularly in the context of lithography systems. In the lithography context, in addition to being non-intrusive and having the ability to precisely detect very small distances (e.g., in the nanometer range, or smaller), the proximity sensor can not introduce contaminants or come in contact with a work piece, typically a semiconductor wafer, flat panel display, or the like. Occurrence of either situation may significantly degrade or ruin the work piece.

Different types of proximity sensors are available to measure very small distances. Examples of proximity sensors include capacitance sensors and optical sensors. These proximity sensors have serious shortcomings when used in lithography systems because physical properties of materials deposited on wafers or substrates may impact the precision of these devices. For example, capacitance gauges, being dependent on the concentration of electric charges, can yield spurious proximity readings in locations where one type of material (e.g., metal) is concentrated. Another class of problems occurs when exotic wafers made of non-conductive and/or photosensitive materials, such as Gallium Arsenide (GaAs) and Indium Phosphide (InP), are used. Further problems can results from light interacting with under-the-surface parts of wafers or substrates, which can cause spurious reflections and unwanted interference patterns. In these cases, capacitance and optical sensors are not optimal.

An alternative approach to proximity sensing uses a fluid gauge sensor. The fluid gauge sensor is not vulnerable to concentrations of electric charges or electrical, optical, and other physical properties of a substrate surface. Current semiconductor manufacturing requires that proximity be gauged with high precision on the order of nanometers. Fluid gauge technology can be an accurate method of measuring the distance to a surface in a close proximity. Fluid gauges are insensitive to the optical or electrical properties of the material being measured. Distance accuracy can be on the order of nanometers. Fluid gauges can be employed in the lithography systems to establish a distance to a top surface of the wafer or substrate.

Focus precision requirements have tightened dramatically as printed feature size shrinks. One issue with fluid gauge proximity sensors is that they require a steady flow of a fluid, which leads to issues of contamination and thermal conditioning. They also are sensitive to low frequency external acoustical interference and sensor offset errors. Lithography tool exposure system stages often employ interferometers to control position, and these can be sensitive to fluids of different content, pressure and temperature. Additionally, the resist use on the wafers or substrates can require specific humidity requirements. Further, each lithography tool can use different wavelengths of light, which may require a different type of conditioned fluid. These requirements mean fluid gauge sensors must carefully choose and condition the fluid (e.g., fluid, nitrogen, argon, etc.) supplied to them. The more sophisticated designs employ a balanced bridge design, and common mode rejection reduces the effects of external acoustical interference.

Therefore, a fluid gauge proximity sensor is desired that can be used in any environment regardless of a resist type on a surface of a work piece or exposure light wavelength, and that is substantially insensitive to external noise.

SUMMARY OF THE INVENTION

An embodiment of the present invention provides a fluid flow proximity gauge, comprising a source of modulated unidirectional or alternating fluid flow and at least one path having a nozzle and a flow or pressure sensor. The fluid exists at a gap between the nozzle and a target and the sensor outputs an amplitude modulated signal that varies according to a size of the gap.

Another embodiment of the present invention provides a fluid gauge system in a lithography tool, comprising a device that modulates fluid flow through the fluid gauge system at a modulation frequency, an analog or digital hardware or software filtering system that filters a signal representative of a measured distance, and an analog or digital hardware or software demodulation system that demodulates the filtered signal at the modulation frequency.

Further embodiments, features, and advantages of the present invention, as well as the structure and operation of the various embodiments of the present invention are described in detail below with reference to accompanying drawings.

BRIEF DESCRIPTION OF THE FIGURES

The accompanying drawings, which are incorporated herein and form a part of the specification, illustrate the present invention and, together with the description, further serve to explain the principles of the invention and to enable a person skilled in the pertinent art to make and use the invention.

Figure 1:
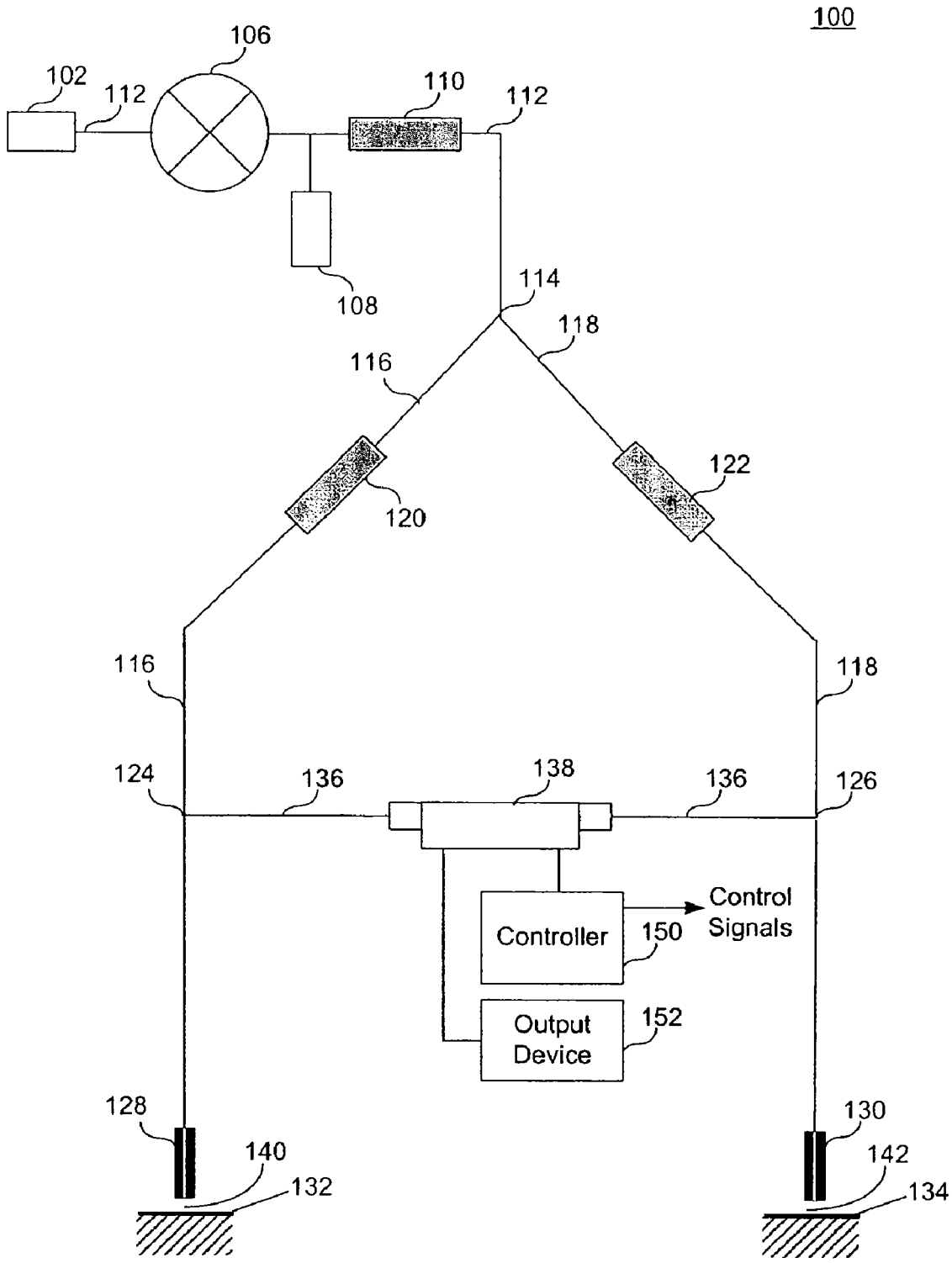
FIG. 1 is a diagram of a fluid gauge proximity sensor, according to one embodiment of the present invention.

The present invention will now be described with reference to the accompanying drawings. In the drawings, like reference numbers may indicate identical or functionally similar elements. Additionally, the left-most digit(s) of a reference number may identify the drawing in which the reference number first appears.

DETAILED DESCRIPTION OF THE INVENTION

Overview

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the present invention would be of significant utility.

An embodiment of the present invention provides a system and method that use a fluid gauge proximity sensor. A source of modulated unidirectional or alternating fluid flow travels along at least one path having a nozzle and a flow or pressure sensor. The fluid exists at a gap between the nozzle and a target. The sensor outputs an amplitude modulated signal that varies according to a size of the gap.

In one example, modulated fluid interacts with only a target (e.g., a measurement surface), while in another example, the modulated fluid interacts with the target and a reference.

The amplitude modulated signal is processed either digitally or in analog devices, which can include being filtered (e.g., band pass, band limited, high pass, etc. filter) to include the modulated frequency and sufficient bandwidth on either side of that frequency and/or being demodulated using a demodulator operating at the acoustical driver modulation frequency.

The flow or pressure sensor can be used for single ended or differential detection of the fluid flow. In one example the flow or pressure sensor can be part of a synthetic bridge, while in another example the flow or pressure sensor can be part of a symmetrical bridge. In either example, the at least one path can include a restrictor.

Using this system and method can result in only ambient acoustical energy in a desired frequency range of the device actually having the opportunity to interfere with the device operation. This can lower the devices overall sensitivity to external acoustical noise and sensor offset.

Throughout this description, "fluid" is used to mean any viscous material, such as, but not limited to, air, gas, liquid, or the like.

Using this arrangement can substantially eliminate the need for a conditioned fluid source and reduce sensor sensitivity to both low frequency external acoustical disturbances and sensor offset errors.

Fluid Gauge Proximity Sensor

FIG. 1 illustrates a fluid gauge proximity sensor 100, according to an embodiment of the present invention. Fluid gauge proximity sensor 100 can include a mass flow controller 106, a central channel 112, a measurement channel 116, a reference channel 118, a measurement channel restrictor 120, a reference channel restrictor 122, a measurement probe 128, a reference probe 130, a bridge channel 136, and a mass flow sensor 138. A fluid supply 102 can inject fluid at a desired pressure into fluid gauge proximity sensor 100.

Central channel 112 connects fluid supply 102 to mass flow controller 106 and then terminates at a junction 114 (e.g., a fluid dividing or directing portion). Mass flow controller 106 can maintain a constant flow rate within fluid gauge proximity sensor 100. Fluid is forced out from mass flow controller 106 through a porous snubber 110, with an accumulator 108 affixed to channel 112. Snubber 110 can reduce fluid turbulence introduced by the fluid supply 102, and its use is optional. Upon exiting snubber 110, fluid travels through central channel 112 to junction 114. Central channel 112 terminates at junction 114 and divides into measurement channel 116 and reference channel 118. In one embodiment, mass flow controller 106 can inject fluid at a sufficiently low rate to provide laminar and incompressible fluid flow throughout the system to minimize the production of undesired pneumatic noise.

A bridge channel 136 is coupled between measurement channel 116 and reference channel 118. Bridge channel 136 connects to measurement channel 116 at junction 124. Bridge channel 136 connects to reference channel 118 at junction 126. In one embodiment, the distance between junction 114 and junction 124 and the distance between junction 114 and junction 126 are equal. It is to be appreciate other embodiments are envisioned with different arrangements.

All channels within fluid gauge proximity sensor 100 can permit fluid to flow through them. Channels 112, 116, 118, and 136 can be made up of conduits (e.g., tubes, pipes, etc.) or any other type of structure that can contain and guide fluid flow through sensor 100, as would be apparent to one of ordinary skill in the art. In most embodiments, channels 112, 116, 118, and 136 should not have sharp bends, irregularities, or unnecessary obstructions that may introduce pneumatic noise, for example, by producing local turbulence or flow instability. In various embodiments, the overall lengths of measurement channel 116 and reference channel 118 can be equal or unequal.

Reference channel 118 terminates adjacent a reference probe 130. Likewise, measurement channel 116 terminates adjacent a measurement probe 128. Reference probe 130 is positioned above a reference surface 134. Measurement probe 128 is positioned above a measurement surface 132. In the context of lithography, measurement surface 132 can be a semiconductor wafer, a flat panel display substrate, or a stage supporting a substrate. Reference surface 134 can be a flat metal plate, but is not limited to this example.

Nozzles are provided in measurement probe 128 and reference probe 130. An example nozzle is described further below with respect to FIGS. 3 and 4. Fluid injected by fluid supply 102 is emitted from nozzles in probes 128 and 130, and impinges upon measurement surface 132 and reference surface 134.

As described above, the distance between a nozzle and a corresponding measurement or reference surface can be referred to as a standoff.

In one embodiment, reference probe 130 is positioned above a fixed reference surface 134 with a known reference standoff 142. Measurement probe 128 is positioned above measurement surface 132 with an unknown measurement standoff 140. The known reference standoff 142 is set to a desired constant value, which can be at an optimum standoff. With such an arrangement, the backpressure upstream of the measurement probe 128 is a function of the unknown measurement standoff 140; and the backpressure upstream of the reference probe 130 is a function of the known reference standoff 142.

If standoffs 140 and 142 are equal, the configuration is symmetrical and the bridge is balanced. Consequently, there is no fluid flow through bridging channel 136. On the other hand, when the measurement standoff 140 and reference standoff 142 are different, the resulting pressure difference between the measurement channel 116 and the reference channel 118 induces a flow of fluid through mass flow sensor 138.

Mass flow sensor 138 is located along bridge channel 136, which can be at a central point. Mass flow sensor 138 senses fluid flow induced by pressure differences between measurement channel 116 and reference channel 118. These pressure differences occur as a result of changes in the vertical positioning of measurement surface 132.

In an example where there is a symmetric bridge, the measurement standoff 140 and reference standoff 142 are equal. Mass flow sensor 138 will detect no mass flow because there will be no pressure difference between the measurement and reference channels 116 and 118. On the other hand, any differences between measurement standoff 140 and reference standoff 142 values can lead to different pressures in measurement channel 116 and reference channel 118. Proper offsets can be introduced for an asymmetric arrangement.

Mass flow sensor 138 senses fluid flow induced by a pressure difference or imbalance. A pressure difference causes a fluid flow, the rate of which is a unique function of the measurement standoff 140. In other words, assuming a constant flow rate into fluid gauge 100, the difference between fluid pressures in the measurement channel 116 and the reference channel 118 is a function of the difference between the magnitudes of standoffs 140 and 142. If reference standoff 142 is set to a known standoff, the difference between fluid pressures in the measurement channel 116 and the reference channel 118 is a function of the size of measurement standoff 140 (that is, the unknown standoff in the z direction between measurement surface 132 and measurement probe 128).

Mass flow sensor 138 detects fluid flow in either direction through bridge channel 136. Because of the bridge configuration, fluid flow occurs through bridge channel 136 only when pressure differences between channels 116 and 118 occur. When a pressure imbalance exists, mass flow sensor 138 detects a resulting fluid flow, and can initiate an appropriate control function, which can be done using optional controller 150 that is coupled to appropriate parts of system 100. Mass flow sensor 138 can provide an indication of a sensed flow through a visual display or audio indication, which can be done through use of optional output device 152.

Alternatively, in place of a mass flow sensor, a differential pressure sensor (not shown) can be used. The differential pressure sensor measures the difference in pressure between the two channels, which is a function of the difference between the measurement and reference standoffs.

The control function in optional controller 150 can be to calculate the exact gap differences. In another embodiment, the control function may be to increase or decrease the size of measurement standoff 140. This is accomplished by moving the measurement surface 132 relative to measurement probe 128 until the pressure difference is sufficiently close to zero, which occurs when there is no longer a difference between the standoffs from measurement surface 132 and reference surface 134.

It is to be appreciated that mass flow rate controller 106, snubber 110, and restrictors 120 and 122 can be used to reduce fluid turbulence and other pneumatic noise, which can be used to allow the present invention to achieve nanometer accuracy. These elements may all be used within an embodiment of the present invention or in any combination depending on the sensitivity desired. For example, if an application required very precise sensitivity, all elements may be used. Alternatively, if an application required less sensitivity, perhaps only snubber 110 would be needed with porous restrictors 120 and 122 replaced by orifices. As a result, the present invention provides a flexible approach to cost effectively meet a particular application's requirements.

In one embodiment of the present invention porous restrictors 120 and 122 are used. Porous restrictors 120 and 122 can be used instead of sapphire restrictors when pressure needs to be stepped down in many steps, and not quickly. This can be used to avoid turbulence.

Flow Restrictors

According to one embodiment of the present invention measurement channel 116 and reference channel 118 contain restrictors 120 and 122. Each restrictor 120 and 122 restricts the flow of fluid traveling through their respective measurement channel 116 and reference channel 118. Measurement channel restrictor 120 is located within measurement channel 116 between junction 114 and junction 124. Likewise, reference channel restrictor 122 is located within reference channel 118 between junction 114 and junction 126. In one example, the distance from junction 114 to measurement channel restrictor 120 and the distance from junction 114 to reference channel restrictor 122 are equal. In other examples, the distances are not equal. There is no inherent requirement that the sensor be symmetrical, however, the sensor is easier to use if it is geometrically symmetrical.

Figure 2:
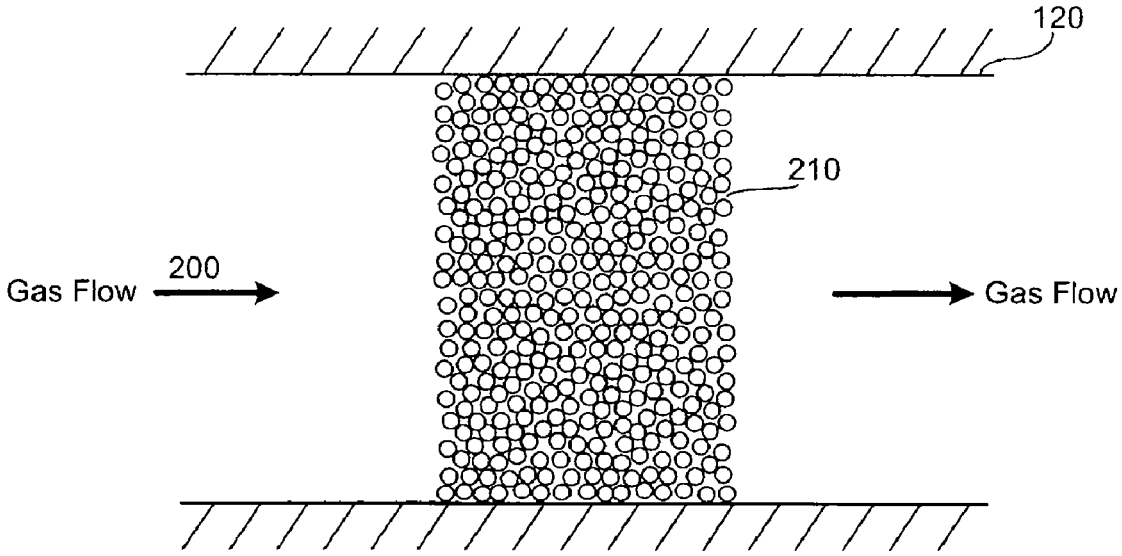
FIG. 2 is a diagram that provides a cross sectional view of a restrictor, according to one embodiment of the present invention.

FIG. 2 provides a cross-sectional image of restrictor 120 having porous material 210 through which a fluid flow 200 passes, according to a further feature of the present invention. Each restrictor 120 and 122 can consist of a porous material (e.g., polyethylene, sintered stainless steel, etc.). Measurement channel restrictor 120 and reference channel restrictor 122 can have substantially the same dimensions and permeability characteristics. In one example, restrictors 120 and 122 can range in length from about 2 to about 15 mm, but are not limited to these lengths. Measurement channel restrictor 120 and reference channel restrictor 122 can evenly restrict fluid flow across the cross-sectional areas of the channels 116 and 118. Porous material restrictors can provide a significant reduction in turbulence and associated pneumatic noise. This is in comparison to the amount of turbulence and noise introduced by restrictors that use a single orifice bored out of a solid, non-porous material.

The restrictors can serve at least two key functions. First, they can mitigate the pressure and flow disturbances present in fluid gauge proximity sensor 100, most notably disturbances generated by mass flow controller 110 or sources of acoustic pick-up. Second, they can serve as the required resistive elements within the bridge.

Exemplary embodiments of a fluid gauge proximity sensor have been presented. The present invention is not limited to this example. This example is presented herein for purposes of illustration, and not limitation. Alternatives (including equivalents, extensions, variations, deviations, etc., of those described herein) will be apparent to persons skilled in the relevant art(s) based on the teachings contained herein. Such alternatives fall within the scope and spirit of the present invention.

Nozzle

Figure 3:
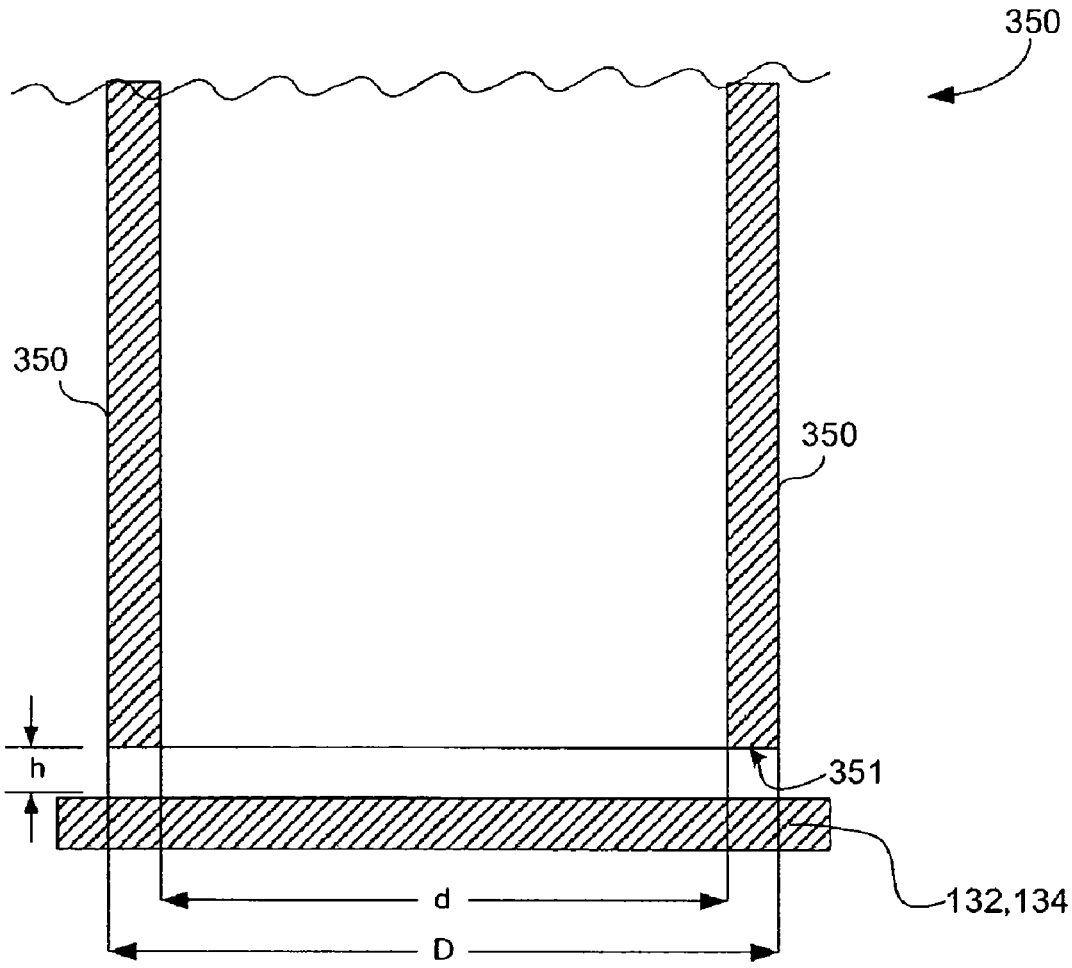
FIG. 3 shows a cross-sectional view of a nozzle and its characteristics, according to one embodiment of the present invention.

FIG. 3 shows a cross-sectional view of a nozzle 350, respectively, and characteristics thereof, according to embodiments of the present invention. The basic configuration of a fluid gauge nozzle 350 is characterized by a flat end surface 351 that is parallel to measurement surface 132 or reference surface 134. The geometry of a nozzle is determined by the gauge standoff, h, and the inner diameter, d. Generally, the dependence of the nozzle pressure drop on the nozzle outer diameter D is weak, if D is sufficiently large. The remaining physical parameters are: $Q_m$—mass flow rate of the fluid, and Δp—pressure drop across the nozzle. The fluid is characterized by the density, ρ, and dynamic viscosity, η.

A relationship is sought between non-dimensional parameters:

$$\frac{\Delta p}{\frac{1}{2}\rho u^2},$$

the Reynolds Number, Re, and h/d, where the radial velocity, u, is taken at the entrance to the cylindrical region between the nozzle face and the substrate surface. The Reynolds number is defined as $$Re = \frac{ud}{v},$$

where v is the kinematic coefficient of viscosity.

Therefore, the behavior of the nozzle can be described in terms of five physical variables: v, Δp, $Q_m$, d, and h. There is a relationship between Δp and h and the remaining variables would be typically constant for a practical system. This relationship facilitates the development of nozzle types for different applications, requiring different sensitivities.

Exemplary embodiments of a nozzle has been presented. The present invention is not limited to this example. The example is presented herein for purposes of illustration, and not limitation. Alternatives (including equivalents, extensions, variations, deviations, etc., of those described herein) will become apparent to persons skilled in the relevant art(s) based on the teachings contained herein. Such alternatives fall within the scope and spirit of the present invention.

Method of Using Sensor

Figure 4:
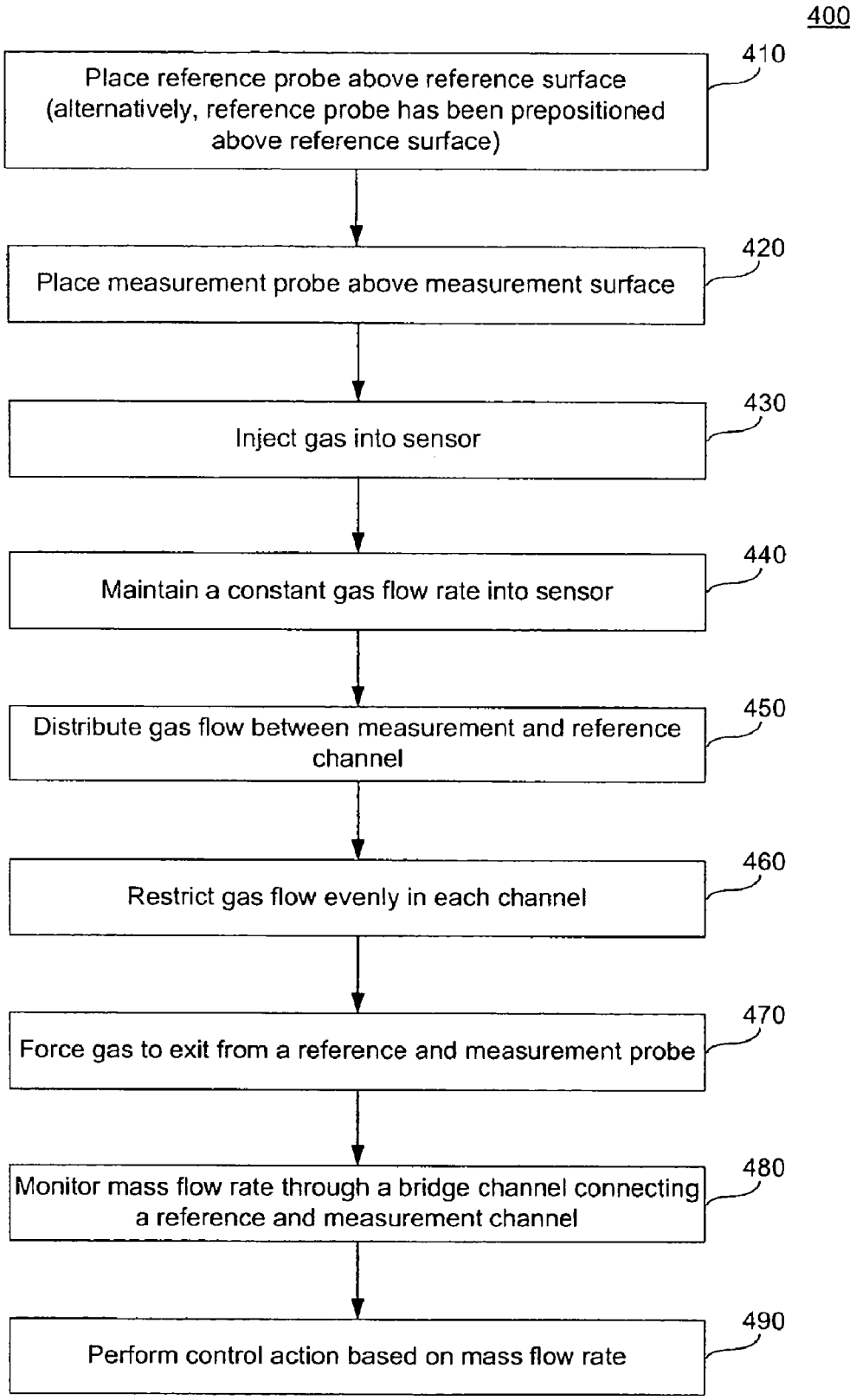
FIG. 4 is a flowchart diagram that shows a method for using a fluid gauge proximity sensor to detect very small distances and perform a control action, according to one embodiment of the present invention.

FIG. 4 illustrates a flow-chart depicting a method 400 for using fluid flow to detect very small distances and perform a control action (e.g., steps 410-470). For convenience, method 400 is described with respect to fluid gauge proximity sensor 100. However, method 400 is not necessarily limited by the structure of sensor 100, and can be implemented with fluid gauge proximity sensor with a different structure.

In step 410, a reference probe is positioned above a reference surface (e.g., by an operator, a mechanical device, a robotic arm, or the like). For example, a robot can position reference probe 130 above reference surface 134 with known reference standoff 142. Alternatively, the reference standoff can be arranged within the sensor assembly, that is, internal to the sensor assembly. The reference standoff is pre-adjusted to a particular value, which typically is maintained constant.

In step 420, a measurement probe is positioned above a measurement surface. For example, measurement probe 128 is positioned above measurement surface 132 to form measurement gap 140.

In step 430, fluid is injected into a sensor. For example, a measurement fluid is injected into fluid gauge proximity sensor 100 with a constant mass flow rate. In step 440, a constant fluid flow rate into a sensor is maintained. For example, mass flow controller 106 maintains a constant fluid flow rate. In step 450, fluid flow is distributed between measurement and reference channels. For example, fluid gauge proximity sensor 100 causes the flow of the measurement fluid to be evenly distributed between measurement channel 116 and reference channel 118.

In step 460, fluid flow in the measurement channel and the reference channel is restricted evenly across cross-sectional areas of the channels. Measurement channel restrictor 120 and reference channel restrictor 122 restrict the flow of fluid to reduce pneumatic noise and serve as a resistive element in fluid gauge proximity sensor 100.

In step 470, fluid is forced to exit from a reference and measurement probe. For example, fluid gauge proximity sensor 100 forces fluid to exit measurement probe 128 and reference probe 130. In step 480, a flow of fluid is monitored through a bridge channel connecting a reference channel and a measurement channel. In step 490, a control action is performed based on a pressure difference between the reference and measurement channel. For example, mass flow sensor 138 monitors mass flow rate between measurement channel 116 and reference channel 118. Based on the mass flow rate, mass flow sensor 138 initiates a control action. Such control action can include providing an indication of the sensed mass flow, sending a message indicating a sensed mass flow, or initiating a servo control action to reposition the location of the measurement surface relative to the reference surface until no mass flow or a fixed reference value of mass flow is sensed. It is to be appreciated that these control actions are provided by way of example, and not limitation.

Additional steps or enhancements to the above steps known to persons skilled in the relevant art(s) form the teachings herein are also encompassed by the present invention.

The present invention has been described with respect to FIGS. 1-4 with reference to fluid or fluid. Thus, in one embodiment, the fluid is fluid.

The present invention is not limited to fluid. Other fluids, fluids, or combinations thereof can be used. For example, depending on the surface being measured and/or a wavelength of light being used, a fluid having a reduced moisture content or an inert fluid may be used. A low moisture content fluid or inert fluid is less likely than fluid to react with the surface being measured.

Sensor Using Ambient Fluid for Fluid Flow

The sensors described in the above embodiments may suffer from ambient noise 501 caused by fluid flow proximate the reference surface 132 and/or measurement surface 138. Sensor 500 is configured to compensate for and/or eliminate effects of an ambient noise signal 501 on a measured signal. Noise signal 501 can be caused by local fluid flow fluctuations near each surface 132 and 134. Noise signal 501 will have a specific frequency range that can be isolated from an arbitrary frequency Fm of a modulation signal 559, which can be adjusted to be distinct from the noise frequency of signal 501

Figure 5:
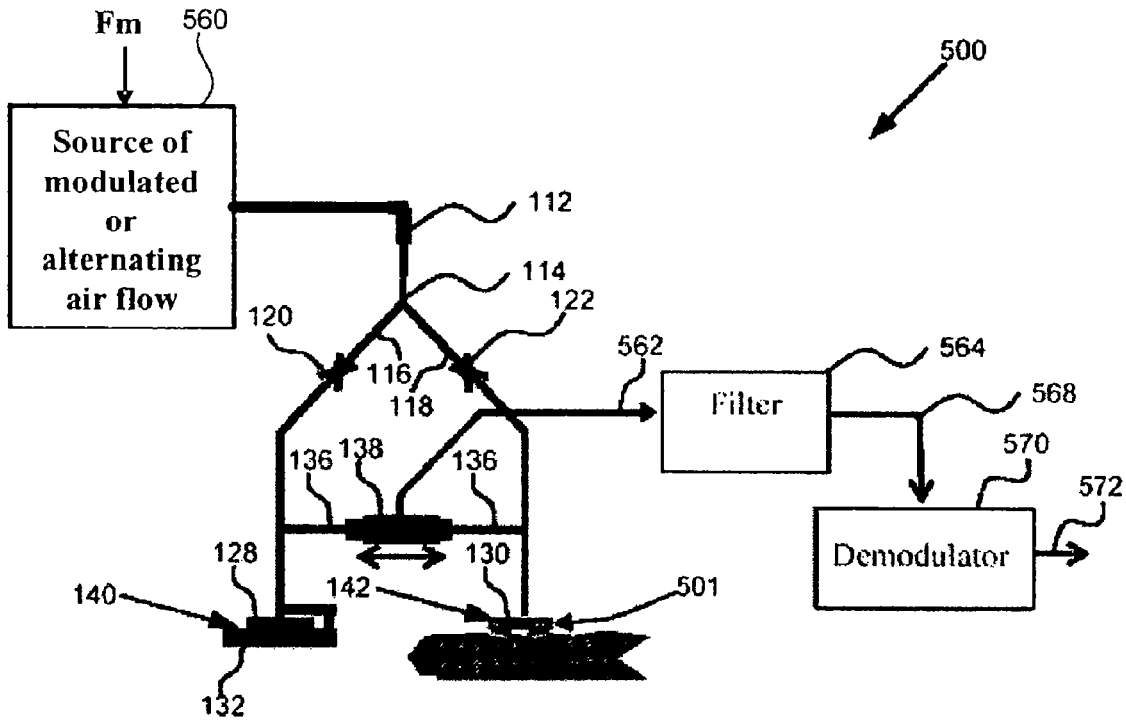
FIG. 5 shows a fluid gauge proximity sensor having modulated fluid flow, according to one embodiment of the present invention.

FIG. 5 shows an fluid gauge proximity sensor, according to one embodiment of the present invention. In this embodiment, instead of using a mass flow controller and conditioned fluid, a source of modulated unidirectional or alternating fluid flow 560 generates an alternating fluid flow that is used to produce a sensor signal 562 that passes through signal processing electronics, such as a filter 564 and a demodulator 570, to remove unwanted portions (e.g., noise 501) of sensor signal 562.

In various embodiments of the present invention, the signal processing electronics can be analog devices, digital devices, or combinations of both and can be implemented in hardware, software, firmware, or combinations of all, which are all contemplated within the scope of the present invention.

Source 560 can be, but is not limited to, a transducer, an acoustical driver, a speaker, a headphone, a piezoelectric crystal, a microphone, a photoelectric cell, or other device that converts input energy of one form into output energy of another. As another example, source 560 can incorporate a surface or a diaphragm displaced by either electromagnetic, electrostatic, piezoelectric, or magnostrictive forces.

In one example, source 560 unidirectionally moves (e.g., pushes and pulls) ambient fluid near probes 128 and 130 through a measuring portion (e.g., measuring channel 116, measuring probe 128, etc, on a measuring side) and/or a reference portion (e.g., reference channel 118, reference probe 130, etc. on a reference side) of sensor 500. A period for pushing and pulling the ambient fluid can be set using a modulation frequency Fm 559 driving acoustical driver 560.

In this embodiment, a first fluid flow proximate probe 128 and a second fluid flow proximate probe 130 are compared using sensor 138 to produce a difference signal 562.

Sensor 138 can be, but is not limited to, a flow sensor, a pressure sensor, or an absolute pressure sensor.

Difference signal 562 can contain information including both wanted portions (e.g., a measurement signal at the modulation frequency and sidebands) and unwanted portions (e.g., noise 501).

Filter 564 (e.g., a band limiting, band pass, high pass, etc. filter) filters difference signal 564 to produce a filtered signal 568. Filtered signal 568 can contain information within a certain frequency range, so that low and/or high frequency noise and interference are filtered out leaving only a desired portion of difference signal 564.

Demodulator 570 demodulates filtered signal 568 using a same frequency (e.g., Fm 559) as a modulation frequency Fm 559 (m stands for modulation) driving acoustical driver 560 produce a demodulated signal 572 (e.g., measurement signal, results signals, etc.). Demodulated signal 572 can contain information about a measurement standoff 142, which also gives information about work piece [138] *132*.

In one example, source 560 unidirectionally moves (e.g., pushes or pulls) ambient fluid near probes 128 and 130 through a measuring portion (e.g., measuring channel 116, measuring probe 128, etc, on a measuring side) and/or a reference portion (e.g., reference channel 118, reference probe 130, etc. on a reference side) of sensor 500. A period for pushing or pulling the ambient fluid can be set using a modulation frequency Fm 559 driving acoustical driver 560. Frequency Fm 559 applied to source 560 can be low enough that the amplitude of cyclic flow are measured, as opposed to measuring the time an acoustic wave takes to reach a target. The net flow through the bridge can be zero.

It is to be appreciated that these embodiments, as well as the other embodiments described herein, can be used with immersion based lithography systems, maskless lithography systems, photolithography system, mask-based lithography or the like.

The wavelength of driving frequency Fm 559 of acoustical driver 560 can be long with respect to length of bridge paths 136. Any imbalance in the bridge can produce an amplitude modulated signal 562 with a carrier frequency of Fm. This modulated signal 562 contains a signal at Fm 559, at an amplitude that varies with the imbalance. As the imbalance occurs at frequencies higher than zero, it results in amplitude modulation of signal 562. This produces a band of frequencies around Fm of ± fg (where fg is a desired response of fluid gauge proximity sensor 500). Filter 564 allows passage of these signals 568, but suppresses all other signals, including the undesired acoustical interference 501. Filter output 568 is measured for amplitude (e.g., demodulated) and the resultant output 572 is the desired bridge imbalance. *In one example, the bridge 136 is modulated at one carrier frequency, while the reference channel 118 is modulated at a second carrier frequency, which is described in more detail below with respect to U.S. Pat. No. 7,021,121.*

For example, if noise 501 is at 10 Hz, then a modulation rate (frequency) of 100 Hz and a pass band of 80-120 Hz would allow only desired portions of differential signal 562 to be used for determining measuring standoff 142.

This embodiment also allows sensor 500 to be used in any type of lithography system using any wavelength without requiring any adaptations or modifications to sensor 500. In the embodiments discussed above using conditioned fluid and a mass flow controller, a different source of fluid (e.g., humidified, dry, specific types of fluid, etc.) had to be used depending on a wavelength of light used in the lithography tool and/or a type of resist used on a substrate. However, with this embodiment shown in FIG. 5, because no conditioned source of fluid is used, sensor 500 can be placed in any type of lithography system regardless of wavelength or resist type. Also, by using only ambient fluid, no contamination is introduced into the system that might have resulted in the above embodiments from the conditioned fluid source.

It is to be appreciated that filter 564 and demodulator 570 can be formed as one device that performs both functions or two or more separate devices. It is also to be appreciated filter 564 and demodulator 570 can be formed from analog and/or digital devices as hardware, software, and/or firmware. When done in a digital domain, quantizers, digital signal processors, and the like, can be used. In various embodiments, demodulator 570 can be similar to any AM radio wavelength demodulation device, can use synchronous detection, or the like. It is also to be appreciated that filter 564 and demodulator 570 can be local within sensor 500 or remote from sensor 500 coupled either through a hardwire or wireless transmission system.

Figure 6:
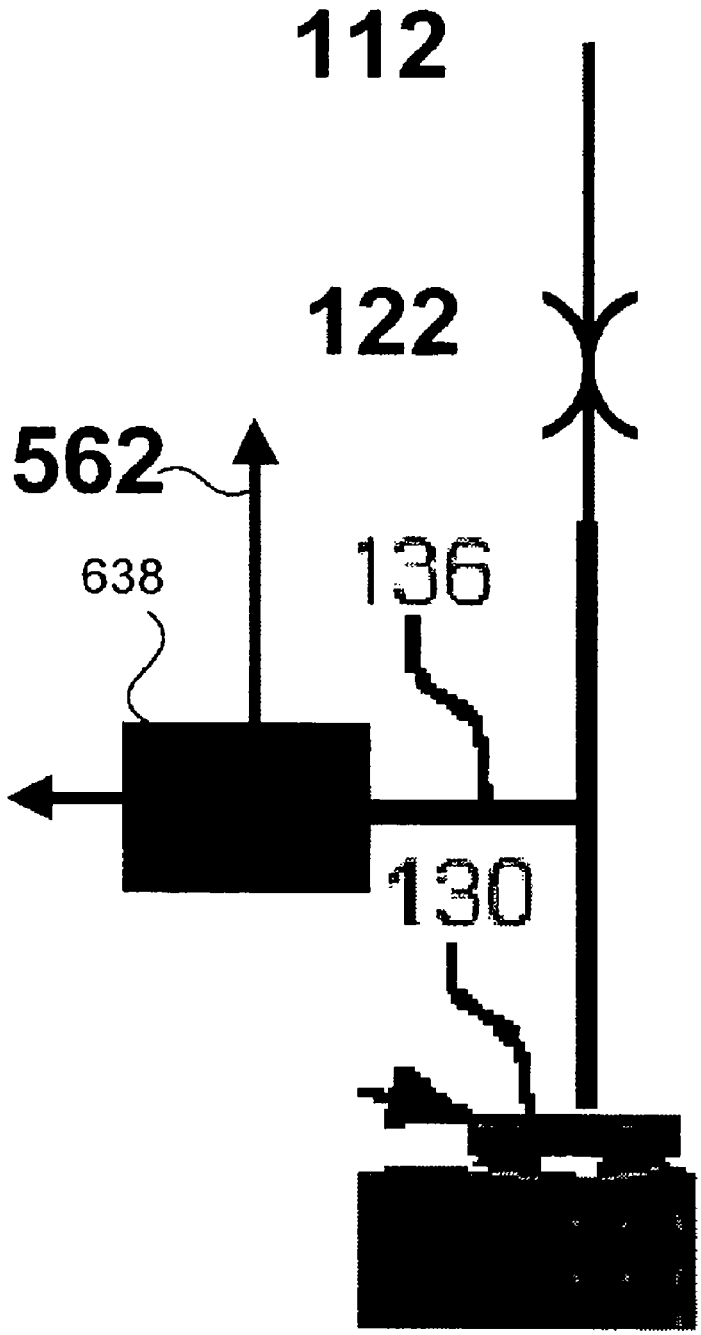
FIG. 6 shows a single ended sensing configuration, according to one embodiment of the present invention.
Figure 7:
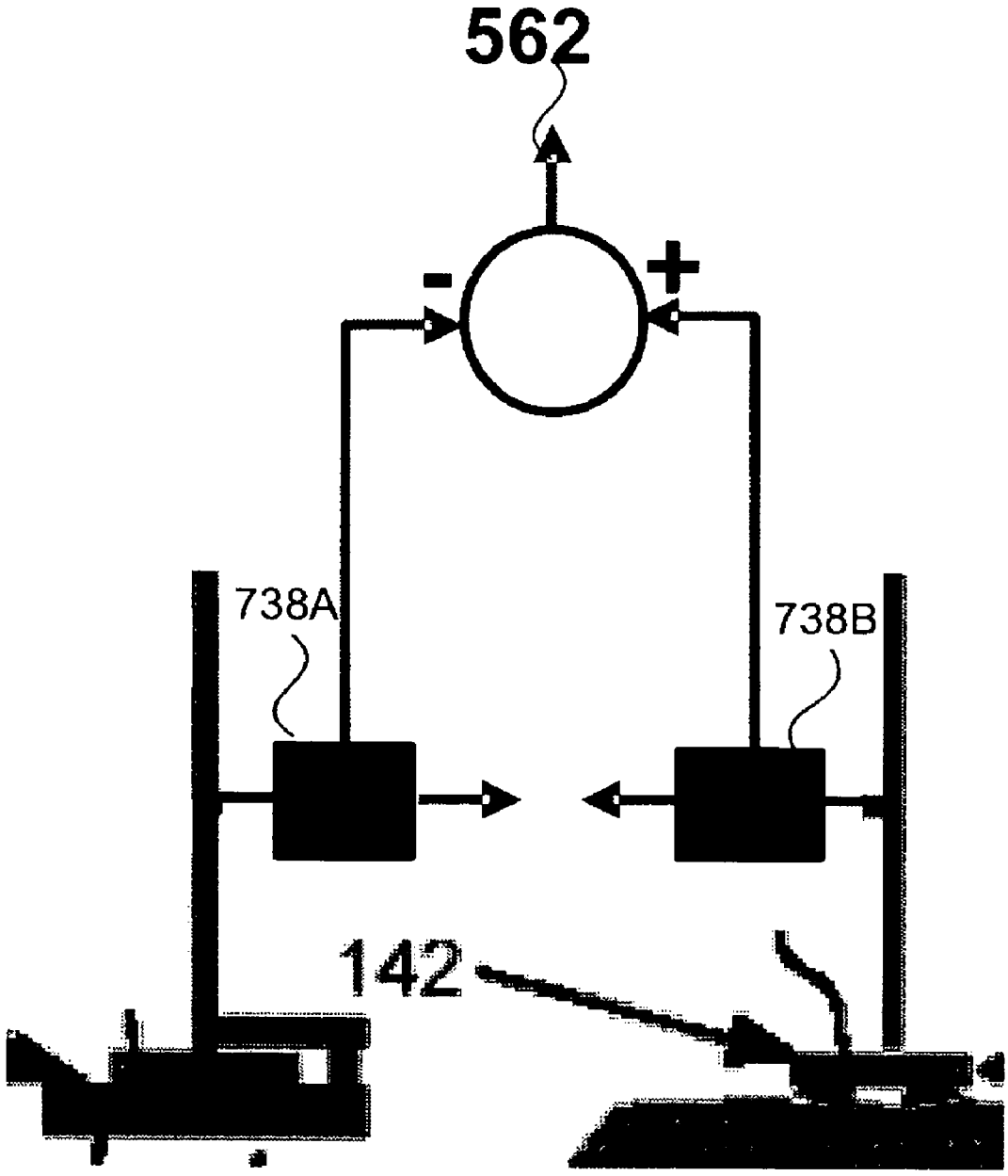
FIG. 7 shows a differential sensing configuration, according to one embodiment of the present invention.

FIGS. 6 and 7 show various sensing schemes that can be used to produce signal 562 according to various embodiments of the present invention.

FIG. 6 shows a single ended sensing configuration, according to one embodiment of the present invention. In this configuration, a single-ended sensor 638 is used to sense modulated fluid flow in a measurement channel to produce signal 562.

FIG. 7 shows a differential sensing configuration, according to one embodiment of the present invention. In this configuration, differential sensors 738A and 738B are used to produce signal 562. In one example, first and second filters (e.g., first and second band pass filters) (not shown) and first and second respective demodulators (not shown) are used to process signal 562.

FIGS. 8, 9, 10, and 11 showing different schemes to produce modulated fluid flow in the system of FIG. 5, according to various embodiments of the present invention.

Figure 8:
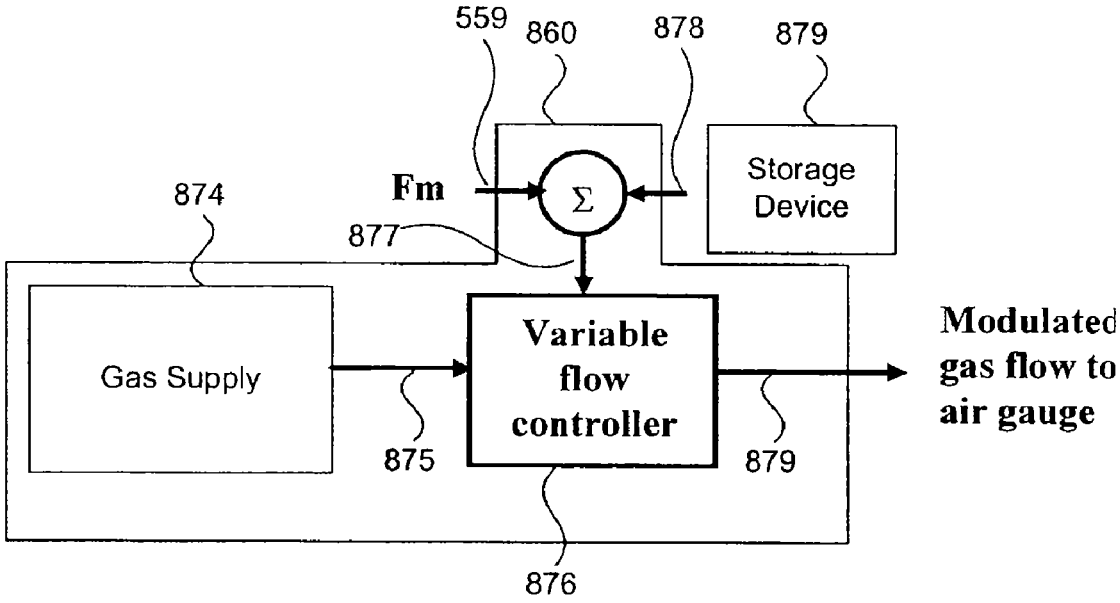
FIGS. 8, 9, 10, and 11 showing different schemes to produce modulated fluid flow in the system of FIG. 5, according to various embodiments of the present invention.

In FIG. 8 a source 860 is shown, according to one embodiment of the present invention. Source 860 includes a fluid supply 874 that provides conditioned fluid 875 at a supply pressure greater than ambient to a variable flow controller 876. A modulation signal 877 is formed from Fm signal 559 summed with a signal 878 (e.g., an average flow setting) accessed from storage device 879. Modulation signal 877 drives variable flow controller 876 to produce a modulated fluid flow 879, which is directed towards fluid gauge 500. In one example, variable flow controller 876 is a high speed variable flow controller that both regulates and modulates flow 879 to fluid gauge 500.

Figure 9:
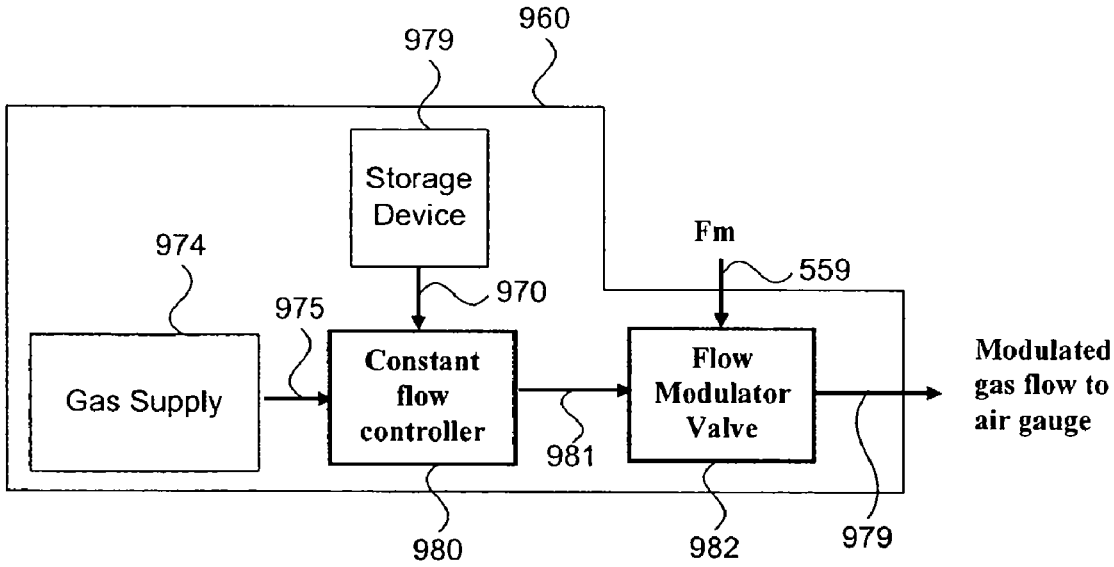

In FIG. 9 a source 960 is shown, according to one embodiment of the present invention. Source 960 includes a fluid supply 974 that provides conditioned fluid 975 at a supply pressure greater than ambient to a constant flow controller 980 that produces a regulated flow. A signal 978 (e.g., an average flow setting) accessed from storage device 979 drives constant flow controller 980 to produce regulated fluid flow 981. Fm signal 559 drives a flow modulator valve 982 to produce an alternating flow to produce modulated fluid flow 979, which is directed towards fluid gauge 500.

Figure 10:
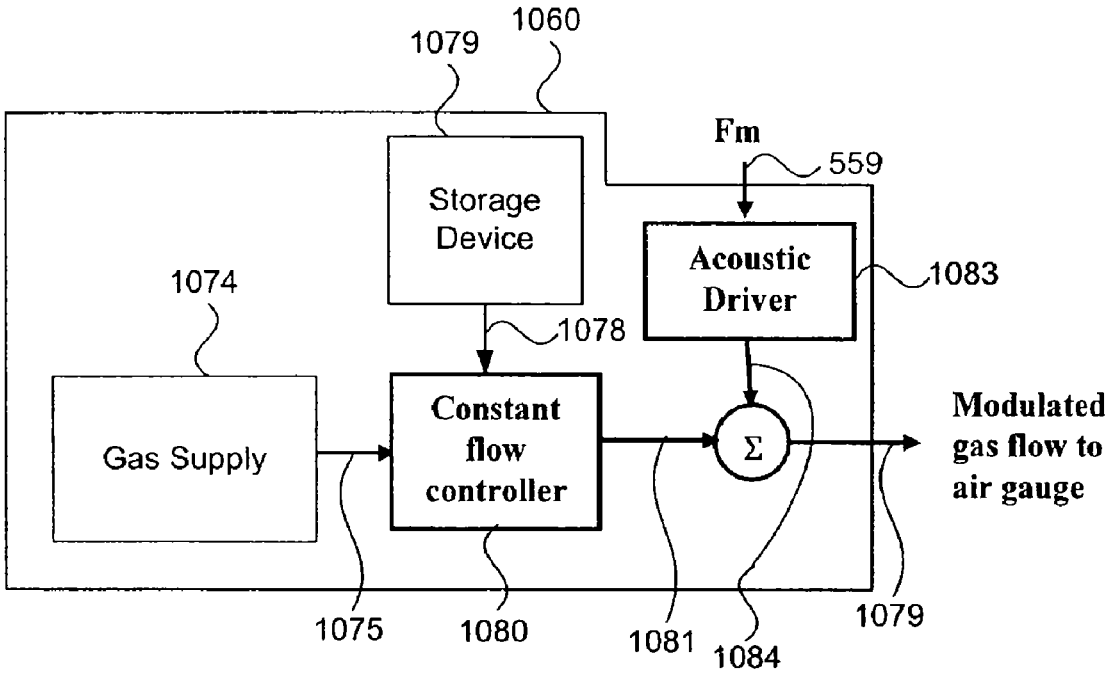

In FIG. 10 a source 1060 is shown, according to one embodiment of the present invention. Source 1060 includes a fluid supply 1074 that provides conditioned fluid 1075 at a supply pressure greater than ambient to a constant flow controller 1080. A signal 1078 (e.g., an average flow setting) accessed from storage device 1079 drives constant flow controller 1080 to produce fluid flow 1081. Fm signal 559 drives a acoustic driver 1083 to produces a signal 1084 that is summed with flow 1081 to produce a modulated fluid flow 1079 from flow 1081, which is directed towards fluid gauge 500.

Figure 11:
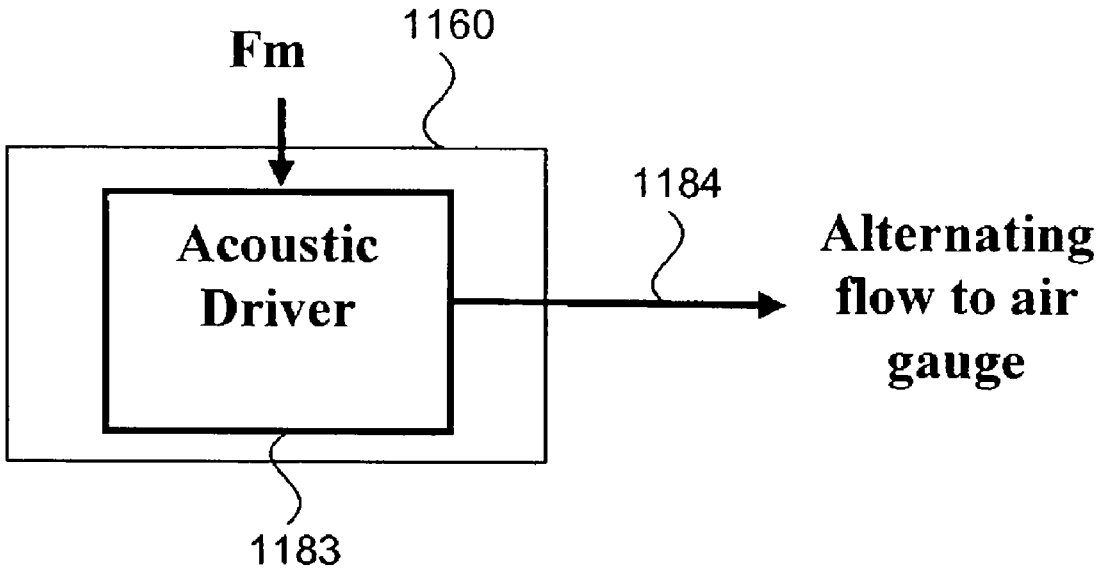

In FIG. 11 a source 1160 is shown, according to one embodiment of the present invention. Source 1160 includes an acoustic driver 1183 that is driven by Fm signal 559 to produce a signal 1184, which is used to modulate ambient fluid flowing in gauge 500.

Exemplary Computer System

Figure 12:
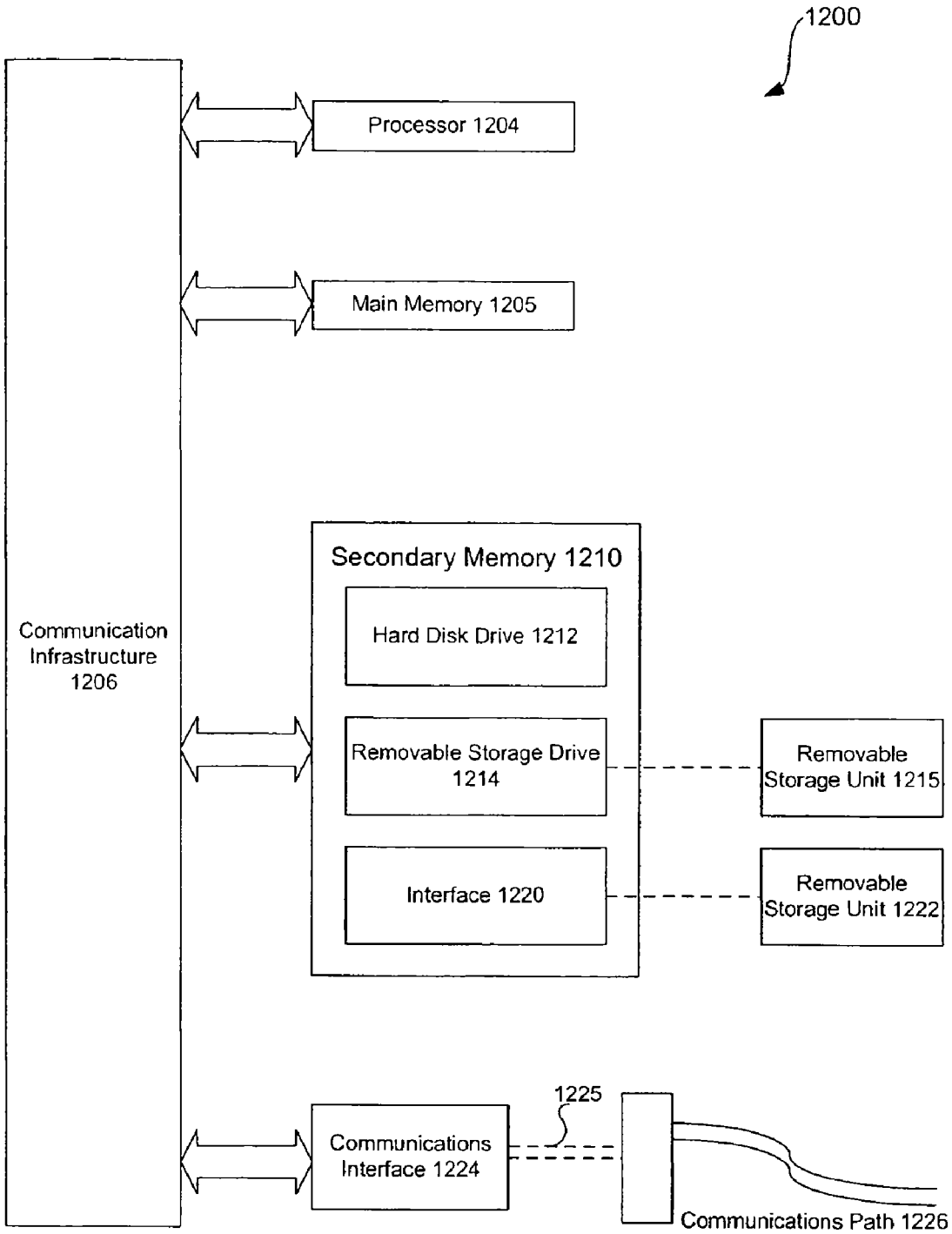
FIG. 12 illustrates an example computer system, in which one or more embodiments of the present invention can be implemented as computer-readable code.

FIG. 12 illustrates an example computer system 1200, in which the present invention can be implemented as computer-readable code. Various embodiments of the invention are described in terms of this example computer system 1200. After reading this description, it will become apparent to a person skilled in the relevant art how to implement the invention using other computer systems and/or computer architectures.

The computer system 1200 includes one or more processors, such as processor 1204. Processor 1204 can be a special purpose or a general purpose digital signal processor. The processor 1204 is connected to a communication infrastructure 1206 (for example, a bus or network). Various software implementations are described in terms of this exemplary computer system. After reading this description, it will become apparent to a person skilled in the relevant art how to implement the invention using other computer systems and/or computer architectures.

Computer system 1200 also includes a main memory 1208, preferably random access memory (RAM), and may also include a secondary memory 1210. The secondary memory 1210 may include, for example, a hard disk drive 1212 and/or a removable storage drive 1214, representing a floppy disk drive, a magnetic tape drive, an optical disk drive, etc. The removable storage drive 1214 reads from and/or writes to a removable storage unit 1218 in a well known manner. Removable storage unit 1218, represents a floppy disk, magnetic tape, optical disk, etc. which is read by and written to by removable storage drive 1214. As will be appreciated, the removable storage unit 1218 includes a computer usable storage medium having stored therein computer software and/or data.

In alternative implementations, secondary memory 1210 may include other similar means for allowing computer programs or other instructions to be loaded into computer system 1200. Such means may include, for example, a removable storage unit 1222 and an interface 1220. Examples of such means may include a program cartridge and cartridge interface (such as that found in video game devices), a removable memory chip (such as an EPROM, or PROM) and associated socket, and other removable storage units 1222 and interfaces 1220 which allow software and data to be transferred from the removable storage unit 1222 to computer system 1200.

Computer system 1200 may also include a communications interface 1224. Communications interface 1224 allows software and data to be transferred between computer system 1200 and external devices. Examples of communications interface 1224 may include a modem, a network interface (such as an Ethernet card), a communications port, a PCMCIA slot and card, etc. Software and data transferred via communications interface 1224 are in the form of signals 1228 which may be electronic, electromagnetic, optical or other signals capable of being received by communications interface 1224. These signals 1228 are provided to communications interface 1224 via a communications path 1226. Communications path 1226 carries signals 1228 and may be implemented using wire or cable, fiber optics, a phone line, a cellular phone link, an RF link and other communications channels.

In this document, the terms "computer program medium" and "computer usable medium" are used to generally refer to media such as removable storage drive 1214, a hard disk installed in hard disk drive 1212, and signals 1228. Computer program medium and computer usable medium can also refer to memories, such as main memory 1208 and secondary memory 1210, that can be memory semiconductors (e.g. DRAMs, etc.) These computer program products are means for providing software to computer system 1200.

Computer programs (also called computer control logic) are stored in main memory 1208 and/or secondary memory 1210. Computer programs may also be received via communications interface 1224. Such computer programs, when executed, enable the computer system 1200 to implement the present invention as discussed herein. In particular, the computer programs, when executed, enable the processor 1204 to implement the processes of the present invention, such as operations in filter 564 and/or demodulator 572 discussed above. Accordingly, such computer programs represent controlling systems of the computer system 1200. Where the invention is implemented using software, the software may be stored in a computer program product and loaded into computer system 1200 using removable storage drive 1214, hard drive 1212 or communications interface 1224.

The invention is also directed to computer products comprising software stored on any computer useable medium. Such software, when executed in one or more data processing device, causes the data processing device(s) to operation as described herein. Embodiments of the invention employ any computer useable or readable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage device, etc.), and communication mediums (e.g., wired and wireless communications networks, local area networks, wide area networks, intranets, etc.). It is to be appreciated that the embodiments described herein can be implemented using software, hardware, firmware, or combinations thereof.

According to further embodiments of the present invention, the sensor described herein may be used within the systems disclosed in U.S. Ser. Nos. 10/322,768, filed Dec. 19, 2002, 10/646,720, filed Aug. 9, 2003 10/833,249, filed Apr. 28, 2004 10/812,098, filed Mar. 30, 2004 and [10/845,429] *10/854,429*, filed May 27, 2004 (*now U.S. Pat. No. 7,021,121 that issued Apr. 4, 2006* (*'the '121 patent*)) and U.S. Pat. Nos. 4,953,388 and 4,550,592, which are all incorporated by reference herein in their entireties. *For example, it is explained in regard to FIG. 5 in the '121 patent, reference surface 132 either is directly modulated or receives a modulation signal*

*574 from a modulation device 576 modulating at F. In this embodiment, a combined gas flow (e.g., a combination of a gas flow near reference surface 132, a gas flow near measurement surface 134, and a gas flow from gas source 102) becomes a modulated gas flow based on the modulation of the gas flow near reference surface 132. Modulation device 576 can be any device that can depart modulation at a frequency F, such as a piezoelectric device, a coil device, or the like, as would be apparent to one of ordinary skill in the art upon reading this description and appended claims.*

*In these embodiments, a sensor 138 is coupled to a filter 564 and a demodulator 570 to produce a demodulated output signal 572. A first gas flow proximate probe 128 and a second gas flow proximate probe 130 are compared using sensor 138 to produce a difference signal 562. Difference signal 562 can include the modulation frequency F and the noise frequency (signal 501), if any. Thus, difference signal 562 can contain information including both wanted (e.g., a measurement signal at the modulation frequency F and sidebands) and unwanted (e.g., noise 501) portions. Filter 564 (e.g., a band limiting, band pass, high pass, or the like) filters the difference signal 564 to produce a filtered signal 568. Filtered signal 568 can contain information within a certain frequency range, so that low and/or high frequency noise and interference are filtered out leaving only a desired portion of difference signal 564. Demodulator 570 demodulates filtered signal 568 using a frequency F equal to the modulation frequency F to produce demodulated signal 572 (e.g., measurement signal, results signals, etc.). Demodulated signal 572 can contain information about a measurement standoff 142, which also gives information about work piece 132.*

Conclusion

While various embodiments of the present invention have been described above, it should be understood that they have been presented by way of example, and not limitation. It will be apparent to persons skilled in the relevant art that various changes in form and detail can be made therein without departing from the spirit and scope of the invention. The present invention has been described above with the aid of method steps illustrating the performance of specified functions and relationships thereof. The boundaries of these method steps have been arbitrarily defined herein for the convenience of the description. Alternate boundaries can be defined. Any such alternate boundaries are thus within the scope and spirit of the claimed invention. Thus, the breadth and scope of the present invention should not be limited by any of the above-described exemplary embodiments, but should be defined only in accordance with the following claims and their equivalents.

What is claimed is:

1. A fluid flow proximity gauge, comprising:

a measuring channel having a measuring gap between a nozzle and a measuring surface;

a reference channel having a reference gap between a nozzle and a reference surface;

a source device of modulated unidirectional or alternating flow of a fluid at the respective gaps between the nozzles and the measuring and reference surfaces;

a symmetrical bridge between the reference channel and the measuring channel, wherein the bridge is modulated at one carrier frequency, while the reference channel is modulated at a second carrier frequency;

a flow or pressure sensor positioned between the reference channel and the measuring channel in the symmetrical bridge, the sensor outputting an amplitude modulated signal that varies according to a size of the gaps; and a signal processor that processes the amplitude modulated signal, wherein the signal processor filters and demodulates the sensor signal to determine the reference gap and to determine a differential gap between the reference gap and the measuring gap.

2. The fluid flow proximity gauge of claim 1, wherein:

the signal processor processes the amplitude modulated signal to remove low frequency errors, a carrier frequency, or noise.

3. The fluid flow proximity gauge of claim 1, wherein the signal processor comprises analog or digital hardware or software.

4. The fluid flow proximity gauge of claim 1, wherein the measuring and reference channels respectively have first and second ones of the flow or pressure sensor.

5. The fluid flow proximity gauge of claim 1, wherein the flow or pressure sensor comprises a flow sensor, a differential pressure sensor, or an absolute pressure sensor.

6. The fluid flow proximity gauge of claim 1, wherein the modulated fluid flow device comprises:

an external supply of conditioned fluid that is fed through a high speed variable flow controller, the flow controller both regulating and modulating the flow to the fluid gauge.

7. The fluid flow proximity gauge of claim 1, wherein the modulated fluid flow device comprises:

an external supply of conditioned fluid;

a constant flow controller that regulates flow; and a control valve that modulates the flow, wherein the external supply of conditioned fluid is sequentially fed though both the constant flow controller and the separate control valve.

8. The fluid flow proximity gauge of claim 1, wherein the modulated fluid flow device comprises:

an external supply of conditioned fluid;

a constant flow controller that regulates flow; and an acoustic driver that produces alternating flow, wherein the external supply of conditioned fluid is first fed through the constant flow controller, then the regulated flow is summed with the alternating flow, which results in a modulated flow.

9. The fluid flow proximity gauge of claim 1, wherein the modulated fluid flow device comprises:

an acoustic driver that produces an alternating fluid flow using ambient fluid.

10. The fluid flow proximity gauge of claim 1, wherein at least one of the reference channel or the measuring channel has a restrictor.

11. The fluid flow proximity gauge of claim 1, wherein:

the signal processor is configured to process the amplitude modulated signal to remove low frequency errors, a carrier frequency, and noise, wherein the signal processor comprises, a first band pass filter and a second band pass filter; and first and second corresponding demodulators.

12. The fluidly proximity gauge of claim 1, wherein the fluid comprises one of a gas or a liquid.

13. The fluid flow proximity gauge of claim 1, wherein the reference channel has a first one of the flow or pressure sensor that produces a first signal; and the measurement channel has a second one of the flow or pressure sensor that produces a second signal, wherein the first and second signals are subtracted to produce the amplitude modulated signal.

14. The fluid flow proximity gauge of claim 13, wherein the first and second ones of the flow or pressure sensor comprise flow sensors, differential pressure sensors, or absolute pressure sensors.

* * * * *